United States Patent [19]
Wickett

[11] Patent Number: 5,827,568
[45] Date of Patent: Oct. 27, 1998

[54] RUBBER BASE ASPHALT EMULSION ADDITIVE

[75] Inventor: Steve R. Wickett, Santa Fe, Tex.

[73] Assignee: Rubber Resources, L.L.C., Houston, Tex.

[21] Appl. No.: 770,125

[22] Filed: Dec. 19, 1996

Related U.S. Application Data

[63] Continuation of Ser. No. 570,739, Dec. 12, 1995, abandoned.

[51] Int. Cl.$^6$ ............................................. C08L 95/00
[52] U.S. Cl. ................................. 427/136; 427/138
[58] Field of Search ............................. 427/136, 138

[56] References Cited

U.S. PATENT DOCUMENTS

| | | | |
|---|---|---|---|
| 2,841,060 | 7/1958 | Coppage | 427/138 |
| 3,253,521 | 5/1966 | Endres | 427/138 |
| 3,338,849 | 8/1967 | Johnson . | |
| 3,513,005 | 5/1970 | Bradshaw et al. | 427/138 |
| 3,635,863 | 1/1972 | Drukker | 524/59 |
| 3,778,397 | 12/1973 | Gannon et al. | 427/138 |
| 3,891,585 | 6/1975 | McDonald | 427/138 |
| 3,919,148 | 11/1975 | Winters et al. | 427/138 |
| 4,018,730 | 4/1977 | McDonald | 524/60 |
| 4,068,023 | 1/1978 | Nielsen et al. | 427/138 |
| 4,086,291 | 4/1978 | Svensson | 524/64 |
| 4,137,204 | 1/1979 | McDonald | 524/70 |
| 4,548,735 | 10/1985 | Bock et al. | 252/312 |
| 4,548,962 | 10/1985 | Lindmark | 523/220 |
| 4,560,482 | 12/1985 | Canevari | 210/749 |
| 4,609,696 | 9/1986 | Wilkes | 524/59 |
| 5,539,029 | 7/1996 | Burris | 524/60 |

FOREIGN PATENT DOCUMENTS

| | | |
|---|---|---|
| 0604258 | 6/1994 | European Pat. Off. . |
| 2581392 | 11/1986 | France . |

OTHER PUBLICATIONS

"Scrap Tire Utilization Technologies," Information Series 116 National Asphalt Pavement Association (Date Unknown).

"Scrap Rubber Bitumen Guide," Roads and Traffic Authority of New South Wales (RTA) (Date Unknown).

C.J. Potgieter, et al. "Bitumen–Rubber Asphalts and Seals – A Report on Full Scale Application"(Date Unknown).

Holleran, G. "Cape Seals –History and Development, Design and Perfomance"(Jan. 1996).

Holleran, G. "The Use of Polymer Modification In Slurry Surfacings"(Feb. 1996).

Reed, J.R., et al. "Quality Assurance of Slurry and Microsurfacing Projects"(Date Unknown).

Holleran, G., et al. "Chipsealing Using Emulsions –Australian and New Zealand Developments"(Date Unknown).

Eps, J.A.. "Uses of Recycled Rubber Tires in Highways, "National Cooperative Highway Research Program, Synthesis of Highway Practice 198, Transportation Research Board, National Research Counsel (National Academy Press, Washington, D.C., 1994).

J.N. Rogers, et al., "Topdressing with Crumb Rubber from Used Tires on Athletic Fields and Other High–Traffic Turf Areas, "Article downloaded from Michigan State University Internet Web Site (www.css.msu.edu) (Date Unknown).

R. Veizer, "Design of a Crumb Rubber Modified Asphalt Pavement Using the Stone Mastic Asphalt Concept, "Article downloaded from Carleton University Civil Engineering Internet Web Site (www.civeng.carl . . . acts) (Date Unknown).

L. Lewandswski, "Polymer Modifiers Changing the Face of Hot Mix,"Asphalt Contractor, Article downloaded from Internet Web Site (www.asphalt.com/ACJan. 1996 (Jan. 1996).

Arthor Unknown, "History of Use of Crumb Rubber in Asphalt Paving Materials,"pp. 4–3–4–8 (Date Unknown).

Primary Examiner—Peter A. Szekely
Attorney, Agent, or Firm—Mark R. Wisner

[57] ABSTRACT

A gel-like emulsion containing natural rubber and crumb rubber from used vehicle tires which may be added to an asphalt paving emulsion at ambient temperature for chip coating, slurry sealing, microsurfacing, soil stabilization or pavement recycling.

4 Claims, No Drawings

5,827,568

RUBBER BASE ASPHALT EMULSION ADDITIVE

This application is a continuation of application Ser. No. 08/570,739, filed on Dec. 12, 1995 now abandoned.

BACKGROUND OF THE INVENTION

1. Field of the Invention

This invention relates to roadway paving materials and more particularly to an emulsion for adding rubber to asphalt paving material.

The benefits of adding rubber to asphalt paving was first proposed in the middle of the last century; however, it was not until about the middle of the present century that the idea of adding vehicle tire rubber to asphalt was developed and crumb rubber from vehicle tires was added. Crumb rubber in an asphalt emulsion proved to be elastic and flexible and is used as a crack sealer with satisfactory results.

It has been found that the use of crumb rubber from scrap vehicle tires added to asphalt also improves road durability. It is now a requirement that pavement asphalt contain a predetermined percentage of recycled rubber as the percentage of the total tons of asphalt laid which is financed in whole or in part by a Federal Assistance Program.

Most asphalts are products of the distillation of crude petroleum and range from hard and brittle-like solids to almost water-thin liquids. Asphalt cement is the basis of these products and may be liquefied for construction purposes by heating, adding solvents, or an emulsifier. Adding diesel fuel to base asphalt results in a product called "cut-back". The use of emulsions rather than cut-backs results in substantial fuel savings.

Asphalt dispersed in water with an emulsifier forms an emulsion.

The purpose of the emulsifier is dispersion of asphalt cement in water for pumping, prolonged storage and mixing. The emulsion should "break" quickly when it comes in contact with aggregate in a mixer or sprayed on a roadbed. When cured, the residual asphalt retains all the adhesive, durability, and water-resistant properties of the asphalt cement from which it was produced.

In the general method for emulsifying asphalt, concurrent streams of molten asphalt cement and water containing an emulsifying agent are directed by a positive displacement pump into a colloid mill and divided into tiny droplets by intense shear stress.

To accomplish its ultimate function of cementing and waterproofing, the asphalt must separate from the water phase. In "breaking" asphalt droplets coalesce and produce a continuous film of asphalt on the aggregate or pavement.

This invention provides a rubber containing emulsion easily added to substantially any conventional asphalt emulsion.

2. Description of The Prior Art

The most pertinent patents are believed to be U.S. Pat. No. 4,018,730 issued Apr. 19, 1977 to McDonald for METHOD FOR EMULSIFYING ASPHALT-RUBBER PAVING MATERIAL AND A STABLE THIXOTROPIC EMULSION OF SAID MATERIAL; and, U.S. Pat. No. 4,137,204 issued Jan. 30, 1979 to McDonald for CATIONIC METHOD FOR EMULSIFYING ASPHALT-RUBBER PAVING MATERIAL AND A STABLE THIXOTROPIC EMULSION OF SAID MATERIAL. U.S. Pat. No. 4,018,730 discloses a method requiring heat and an alkali hydroxide-asphalt emulsifier mixture, where the asphalt emulsifier is a resin, tall oil fatty acid, oleic acid, stearic acid, animal protein, or casein, for emulsifying an asphalt and reclaimed rubber pavement repair material into a thixotropic emulsion capable of flowing as a liquid upon agitation. U.S. Pat. No. 4,137,204 substantially discloses the same emulsion as a base and adds an asphalt-rubber soap containing a cationic water soluble emulsifying agent.

This invention is distinctive over these patents by forming an asphalt modifying emulsion, mixed under ambient temperature and containing a relatively high percentage of reclaimed rubber that may be added to and mixed with, under ambient temperature, substantially any known asphalt paving material mix containing less than a predetermined required percentage of rubber for increasing the rubber content thereof.

SUMMARY OF THE INVENTION

This emulsion contains equal parts by weight of rubber and solvent forming a base total for calculating the quantities of the remaining ingredients, consisting of: water; a nonionic emulsifier; binders; an antistripping agent; and, color.

All ingredients are mixed at ambient temperature before adding and commingling the crumb rubber with the emulsion.

The principal object of this invention is to provide an emulsion containing a relatively high percentage of rubber which may be added to substantially any asphalt emulsion under ambient temperature or up to 150° F. (66° C.) to increase the rubber content thereof to a predetermined percentage.

DESCRIPTION OF THE PREFERRED EMBODIMENT

This crumb rubber asphalt modifying emulsion consists of equal parts by weight of a solvent and crumb rubber. The total parts by weight of these two ingredients equal a 100% base for calculating the quantities of the remainder of the formula which comprises; an emulsifying agent; an antistripping agent; binders; and, color.

The solvent is an aliphatic solvent, preferably SHELL SOL 340HT, a complex combination of predominately C9 and C12 hydrocarbons, available from Shell Oil Co. This solvent tends to dissolve natural and synthetic rubber small size particles reclaimed from discarded vehicle tires and swells and softens the larger size particles of crumb rubber. The preferred size of the crumb rubber particles is 25–50 mesh.

The quantity of water used is 30–40% of the base weight. The emulsifying agent comprising 10–15% of the base weight is a nonionic ethoxylated nonylphyenol. A first binder, comprising 5% of the base weight is a clay mineral containing silicon and aluminum, marketed under the trademark IMVITE IGB, by Industrials Minerals Ventures, 2030 East Flamingo, Las Vegas, Nev. 89119.

A stripping agent binder comprising 1–2% of the base weight, is aliphatic amines (polyamines), commonly known by the trademark NRD BOTTOMS which enhances asphalt sticking to a roadbed and retards asphalt bleeding through a chip seal wearing surface; 1–2% of the base weight of atactic polyproplene powder, commonly known as PPA; and 1–2% of the base weight of a selected color such as carbon black.

A preferred example of the emulsion consists of 100 pounds (45 kg) of the solvent; 100 pounds (45 kg) of rubber; 60 pounds (27 kg) of water.; 4 pounds (1.8 kg) of nonionic emulsifier; 5 pounds (2.25 kg) IMVITE IGB; 2 pounds (0.9 kg) each of NRD BOTTOMS; PPA; and black color for a total of 275 pounds.

The quantity of each of the principal ingredients, solvent and rubber, may be varied from 3 to 7 parts by weight to achieve the base weight. The quantity of the remaining ingredients of the formula may be 3 to 4 parts by weight of water; emulsifying agent 1.5 parts by weight; binder IMVITE IGB ½ part by weight; and the three remaining ingredients as follows: antistripping agent, APP and color, each 1/10 to 1/5 part by weight.

The invention has been described in conjunction with preferred embodiments and variations thereof and it seems obvious that various changes such as substitution of equivalents and other alterations may be made in the formula while maintaining a preferred quantity of crumb rubber.

I claim:

1. A method of applying an asphalt-based emulsion to a surface comprising the steps of mixing an aliphatic solvent and crumb rubber in a ration of 3:7 to 7:3 parts by weight with an emulsifying agent and water at ambient temperature to obtain an asphalt modifying emulsion and thereafter mixing the asphalt modifying emulsion with an asphaltic material at temperatures ranging from ambient temperature up to 150° F. and applying the mixture of asphaltic material and asphalt modifying emulsion to a surface.

2. The method of claim 1 wherein the water is mixed with the aliphatic solvent, crumb rubber, and emulsifying agent in a ratio of about 3–4 parts water for 10 parts of aliphatic solvent and crumb rubber.

3. The method of claim 1 wherein the asphalt modifying emulsion is mixed with asphaltic material by directing to a positive displacement pump into a colloid mill.

4. The method of claim 1 additionally comprising mixing a binder into the asphalt modifying emulsion.

\* \* \* \* \*